Patented July 11, 1933

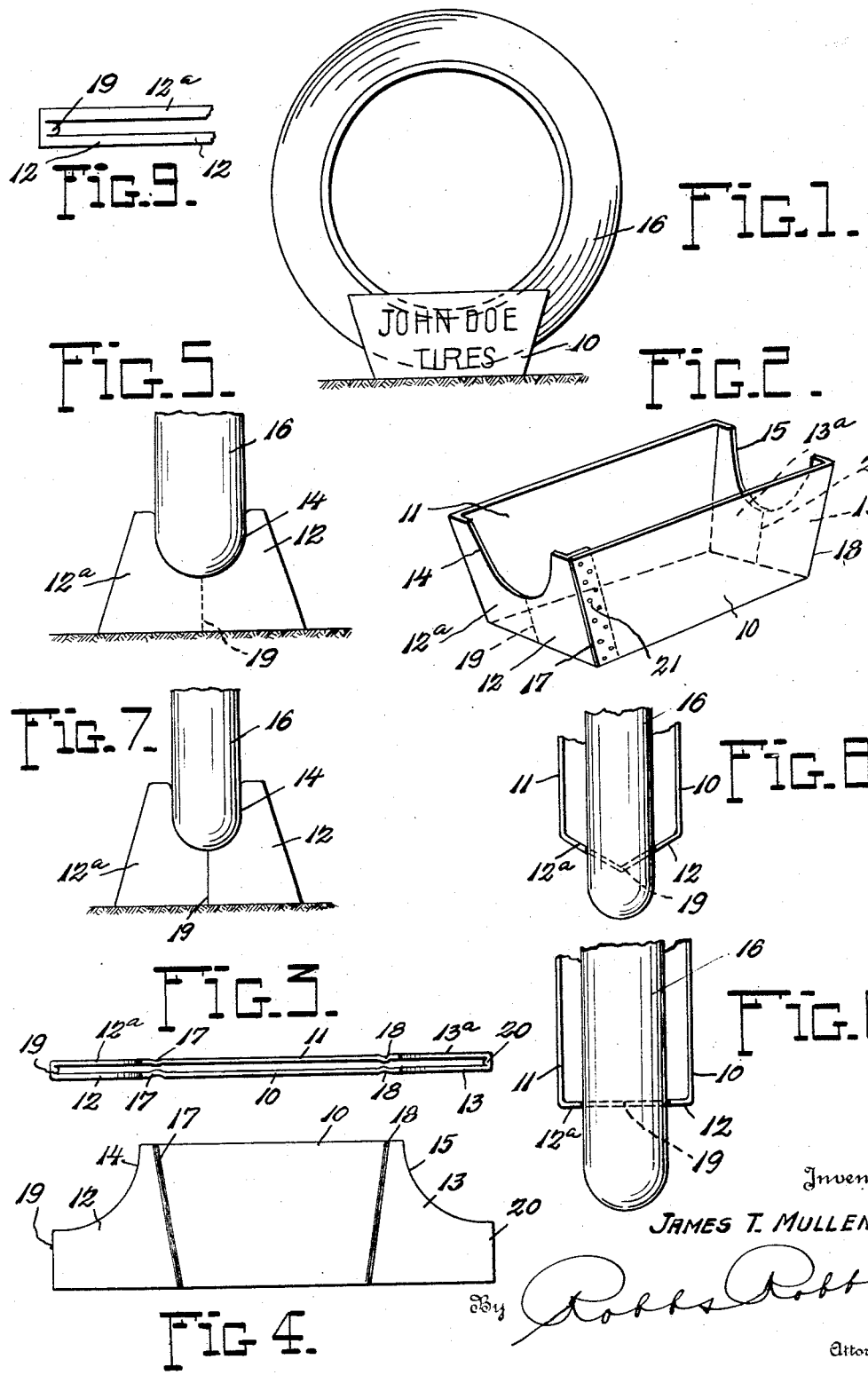

1,917,596

UNITED STATES PATENT OFFICE

JAMES T. MULLEN, OF CLEVELAND, OHIO, ASSIGNOR TO THE DYMENT COMPANY, OF CLEVELAND, OHIO, A CORPORATION

TIRE STAND

Application filed May 15, 1931. Serial No. 537,679.

The present invention has for one of its objects the provision of a one-piece advertising display stand especially adapted to receive automobile tires for the display thereof, and stand being adapted to hold the tire in an upright position and to receive and so hold a tire of any given size and thickness.

More specifically, the invention provides a device of this character which is formed of a one piece paper or cardboard stock which renders it cheaply and readily manufactured, and which can be readily folded in a novel manner to render the stand collapsible and self-adjusting to fit a tire of any given size and thickness which may be desired to be placed on display therein; and while it is not intended to limit the invention to a stand formed of paper or cardboard stock, as obviously other flexible materials will be suitable, such stock is very convenient, since it can be readily procured in such thickness as will render the stand of required rigidity and firmness, it can be readily shaped into the desired form, and, obviously, is capable of carrying any desired design or indicia of advertising and can easily have applied to it any instrumentalities of a kind which will enhance the appearance of the display.

In general, the support or stand forming the subject-matter of this invention is conveniently formed of a one-piece multiple-ply cardboard or paper stock of desired thickness, the stand being formed with ends capable of being collapsed so that the sides of the support may be brought closer together to hold tires of various thicknesses. The ends are also preferably cut out to form a recess of the configuration of a tire, the tire resting in the recess at each end when on display in this support, the depth of each recess being such that the tire will rest therein and be supported by the sides of the recess so as to sit in an upright position upon the support. The shape of the ends and the nature of the recess, together with the flexibility of the folds, hereinafter to be described in detail, render the stand self-adjusting to any tire placed upon it.

In order to render the ends readily collapsible, each end is folded along its lines of juncture with the sides in a wide flat fold along each line, and also each end is folded lengthwise in a wide flat fold in a vertical plane along the middle line of each end. In each fold the plies of the material are separated, and the fold in each instance serves as a hinge. One advantage of this type of fold is that the sides of the stand remain parallel in any position of adjustment of the stand, so that a tire resting upon the stand will be firmly supported irrespective of what the thickness of the tire may be. Also, the support is thus rendered freely collapsible, so that it will readily adjust itself to any thickness of tire placed upon it, the adjustment being effected through the action of the weight of the tire placed upon the support.

The middle folds of the ends are such that irrespective of the position of adjustment of the stand, the ends will have a substantially square configuration at their extremities, thus increasing the stability of the support afforded by the stand; these folds or creases also maintain the sides at all times more or less separated, thus assuring the stand being adapted at all times to rest in an upright position upon a horizontal surface, irrespective of whether or not a tire is actually supported upon it. By decorating the sides and ends in any desired fashion, a very pleasing and striking display can be presented.

It may be here pointed out also that the creases or folds in the ends are such as to present a minimum of visibility to an observer, the shape of such creases or folds being such that sharp creases are avoided, thus keeping at an absolute minimum all impressions of deformation which would detract from the general appearance of the display.

The invention will be more readily understood by reference to the accompanying drawing in which;

Fig. 1 represents a front elevation of a support formed in accordance with this invention, the support having a tire resting upon it;

Fig. 2 is a perspective view of the present support, showing the support in its position of maximum distension;

Fig. 3 is a top view of the support showing it in collapsed position;

Fig. 4 is a side elevation of the support showing it in the position of Fig. 3;

Fig. 5 is an end view of the support showing it fully distended with a fragment of a tire of maximum thickness resting thereon;

Fig. 6 is a fragmentary plan view of the device as shown in Fig. 5;

Fig. 7 is a view similar to Fig. 5, showing the support with a tire of less thickness carried upon it;

Fig. 8 is a fragmentary plan view of the device shown in Fig. 7; and

Fig. 9 is an enlarged plan view of one of the ends of the device as illustrated in Fig. 3, showing the square fold across the middle of the end.

Referring more particularly to the drawing, the stand is composed of the front and rear members 10 and 11, respectively, forming the sides and the end members 12 and 13. These ends are cut away to form cooperating recesses or grooves 14 and 15 of a configuration corresponding to the sides of a tire 16 resting therein. It will be seen that these recesses 14 and 15 are sufficiently deep so that the tire supported therein will be held in upright position irrespective of the thickness of the tire.

To render the ends 12 and 13 collapsible, they are of course folded along their lines of juncture with the sides, as indicated at 17 and 18, for example, there being, as clearly shown, corresponding folds or creases at both the front and rear sides of the device. Extending vertically across the middle of the ends are the folds 19 and 20, respectively, which divide the respective ends into front and back sections and which, together with the folds at the corners of the front and rear faces make the stand readily collapsible to accommodate any desired size of tire. These creases or folds in each instance are bent inwardly and are of substantially square configuration, which assures sufficient space being left between the front and back members of the stand, even when the stand is completely collapsed, to permit it sitting upright upon a horizontal surface. The configuration of the folds in each instance is such as to avoid the appearance of sharp breaks to an observer, this being accomplished by separating the plies of the material of which the stand is formed more to the rear, or interiorly, of the stand than toward the front or outside thereof.

The result of the arrangement is, as will be seen from Fig. 2, that when the device is fully extended the ends 12 and 13 are flat, but when partially collapsed the sections of the ends assume a more pointed relationship, although it will be apparent that the sides 10 and 11 are maintained parallel in all positions of adjustment. In other words the angles formed by each end are at all times equal to the angles formed by the other end in all positions of extension or collapse of the stand. It will also be seen that the folds 19 and 20 are at all times substantially square in their configuration, these folds being, as previously mentioned, of substantial width in order to assure this configuration, which tends to increase stability of the support and flexibility of its bends.

Each of the folds of the device acts as a hinge, and renders the support readily and automatically adjustable to any thickness of tire which is supported upon it, the adjustment being effected in response to the weight and thickness of the tire, the stand or support requiring no manipulation beyond the placing of the tire upon it, once the sides have been spread sufficiently to permit the insertion of the tire between them. It will also be apparent that the stand is capable of being manufactured from one piece of stock bent into the desired shape and provided with the proper creases, the ends of the strip being secured together, as indicated at 21, in any desired fashion.

For convenience, the sections of each end are designated 12, 12a and 13, 13a, respectively, the sections 12a and 13a forming the back portions of the ends, in accordance with the illustrations, when the stand is collapsed. When fully extended it will be apparent that the parts 12, 12a and 13, 13a of the respective ends will be flush. When in this position the stand will accommodate tires of the maximum thickness, but it will also be apparent that tires of any less thickness will also be just as readily accommodated.

It will be apparent that the device herein specifically described and illustrated is susceptible to modification of the details herein specifically set forth without any departure from the underlying invention concept. It will accordingly be understood that it is intended and desired to embrace within the scope of this invention such modifications and changes as may be necessary to adapt it to varying conditions and uses.

Having thus described my invention what I claim as new and desire to secure by Letters Patent of the United States is:

1. As a new article of manufacture, a collapsible display support forming a tire stand, the same including sides and ends, the ends extending transversely of and connecting the sides, hinge folds intermediate the ends and the sides connecting said parts together, and a middle hinge fold located vertically of each end so that the ends which are normally transverse to the sides when the stand is in use may be adjusted with the portions at opposite sides of the intermediate folds flat relatively to each other when the stand is collapsed, the said ends having recesses forming seats for engagement with the peripheral portion of a tire, the said foldable end portions being inclined inwardly and downwardly from their upper edges.

2. As a new article of manufacture, a display support forming a stand for tires or the like, the same comprising spaced sides, ends connecting the sides and having hinge folds at the points of connection with the sides, said ends each having a vertical fold midway of its other folds by which it is joined to the sides, whereby on positioning the sides together, the said ends may be folded outwardly so that portions thereof may become aligned with the sides and thus the whole support collapsed, said ends having also curved recesses in their upper edges providing seats in which a tire may engage when supported by the support.

3. As a new article of manufacture, a display support forming a stand for tires or the like, the same comprising spaced sides, ends connecting the sides and having hinge folds at the points of connection with the sides, said ends each having a vertical fold midway of its other folds by which it is joined to the sides, whereby on positioning the sides together, the said ends may be folded outwardly so that portions thereof may become aligned with the sides and thus the whole support collapsed, said ends having also curved recesses in their upper edges providing seats in which a tire may engage when supported by the support, the said support being made in one continuous piece, the ends of which are joined together at a suitable point to provide a unitary collapsible device.

4. As a new article of manufacture, a box-like collapsible support comprising end and side members, a hinge fold interconnecting each side with each end, a hinge fold extending vertically across each end for allowing the ends to fold, each end being flatly extensible when the support is fully extended and having substantially semi-circular cut-out portions for receiving an article to be supported, the entire support being collapsible along each fold upon application of a suitable collapsing force upon the ends, and being formed of one-piece stock having its ends secured together at one of the sides of the finished support adjacent one end of the support.

In testimony whereof I affix my signature.

JAMES T. MULLEN.